United States Patent

[11] 3,632,303

| [72] | Inventor | Franz Xaver Aigner<br>Bielitzerstr. 12, Munich, Germany |
|---|---|---|
| [21] | Appl. No. | 758,847 |
| [22] | Filed | Sept. 10, 1968 |
| [45] | Patented | Jan. 4, 1972 |
| [32] | Priorities | Sept. 11, 1967 |
| [33] | | Germany |
| [31] | | M 59927;<br>Apr. 30, 1968, Germany, No. P 17 67 346.0 |

[54] STERILIZING APPARATUS
4 Claims, 4 Drawing Figs.

[52] U.S. Cl. .................................................... 21/93,
    21/103, 49/209, 49/477
[51] Int. Cl. ....................................................... A61l 3/00
[50] Field of Search ............................................. 21/93–98,
    103; 23/290; 49/209, 316, 317, 477

[56] References Cited
UNITED STATES PATENTS

| 1,409,286 | 3/1922 | Diner ........................... | 21/98 |
| 2,507,360 | 5/1950 | Wicks........................... | 49/477 X |
| 3,224,382 | 12/1965 | Floehr.......................... | 49/477 X |
| 3,371,986 | 3/1968 | Brown........................... | 21/103 X |
| 3,386,206 | 6/1968 | Loveless........................ | 49/209 X |
| 3,488,142 | 1/1970 | Cooper.......................... | 21/103 X |
| 3,500,584 | 3/1970 | Clery et al. ................... | 49/477 X |
| 3,511,593 | 5/1970 | Thomas et al. ................. | 21/93 |

FOREIGN PATENTS

| 661,714 | 4/1963 | Canada ......................... | 21/98 |

*Primary Examiner*—Joseph Scovronek
*Assistant Examiner*—D. G. Millman
*Attorney*—Wolfgang G. Fasse ABSTRACT: A sterilizing apparatus with a cylindrical chamber is provided with a rectangular opening adapted to be closed by a rectangular, plane (not curved) door having hydraulically operated sealing means, whereby the good compressive strength of the cylindrical chamber and the good sealing characteristics of a plane door are combined with each other.

STERILIZING APPARATUS

The present invention relates to sterilizing apparatus comprising a cylindrical autoclave with one or more cylindrical chambers having end faces, at least one of which has preferably a plane end face. At least one end face is provided with a tightly closed opening for charging and discharging the apparatus with goods to be sterilized.

In prior art apparatus of this kind the opening is round and adapted to the cylindrical shape of the sterilizing chamber. On the other hand, known sterilizing autoclaves with a chamber bounded by rectangular, plane walls have merely a rectangular opening. However, sterilizing devices with a cylindrical chamber have a number of advantages as compared to sterilizing chambers with a rectangular cross section. For example, in cylindrical chambers the stresses due to pressure are more advantageously distributed. Accordingly, mechanical tensile forces in the chamber walls are also more evenly distributed. Concentration of tensile forces as are occuring in rectangular or square chambers along manufactured seams and welds especially in spots where the walls form a corner, cannot occur in a cylindrical chamber.

In view of the above, cylindrical chambers may be manufactured with thinner walls whereby a substantially lower weight is achieved. This in turn greatly facilitates the manufacturing process, the transportation and in certain instances also the installation of the sterilizing apparatus.

Yet another advantage of the cylindrical or round chamber is seen in the fact that the periodic cleaning operation may be performed much more easily. Any condensate will also flow off more easily and more completely from a cylindrical chamber.

In spite of the above advantages of the round of cylindrical structure, most prior art sterilizing autoclaves and especially those of larger capacity, have been built with rectangular, plane walls. Presumably this may have been due to the fact that normally the sterilizing chambers are being charged or filled with rectangularly shaped containers or by means of carts which also have a rectangular cross section. Further, the assumption may have been controlling that with such rectangular charging devices the rectangular chamber would have the least unused chamber volume, or stated differently, that the efficiency would be at an optimum.

Besides, known sterilizing devices with a cylindrical chamber and a round opening closeable by a hinged door have been considered to be too expensive, unsightly and bulky, because due to the pressure the doors must have a sturdy structure relative to the lighter structure of the cylindrical chamber walls. In addition such hinged doors cause substantial difficulties in assuring a proper closing especially an airtight closing.

In view of the above it is the main object of the invention to assure in a sterilizing apparatus the advantages of a cylindrical chamber or autoclave while simultaneously avoiding the drawbacks outlined above.

Another object is to provide a cylindrical sterilizing apparatus with a rectangular or square charging and discharging opening which is closeable by a rectangular or square closure member in an airtight manner without any sealing problems.

A further object of the invention is to provide a cylindrical sterilizing apparatus having a tapering end to provide space for accommodating charging and discharging apparatus as well as other means useful in the operation of the sterilizing apparatus.

Yet another important object of the invention is to provide a sterilizing apparatus in which preheating means, such as heating coils need not be welded to the walls of the sterilizing chamber.

Another object is to provide a sterilizing chamber with a single wall, as distinguished from a double wall, so that any pipe inlets and outlets may be welded on the inside as well as on the outside of the chamber wall.

According to the invention the above objects have been achieved in a surprisingly simple manner in that the door for a charging and discharging opening of a sterilizing autoclave is provided as a rectangular hinged or sliding closure plate and that the opening also either has a rectangular form or is provided with rectangular flange or adapting means for adapting the autoclave opening to the rectangular closure plate.

The rectangular opening may be precisely adapted to the rectangular cross section of the charging means such as containers, carts or the like. The closure plate may either be operated as a sliding door or it may be provided with conventional central locking means. In any event the invention realizes the important advantage that the closure means may have smaller dimensions than would be necessary for closing a round opening having a diameter corresponding to the diameter of the cylindrical chamber because the useable space in the chamber has a rectangular cross section due to the rectangular shape of the charging means, and hence the size of the rectangular opening needed may correspond to such rectangular cross section the corners of which touch a circle having a diameter corresponding to the diameter of the cylindrical chamber.

Further, the rectangular sliding door makes the sealing of the opening relatively simple because the sliding door may glide in parallel to the plane of the opening. Hence the closure means may be pressed tightly against a rim or edge of the chamber opening.

The rectangular opening of the chamber as provided by the invention leaves a segmental space between its edges and an assumed extension of the cylinder wall reaching up to said edges. According to the invention such space, especially the space below the lower edge of the opening, may be used to accommodate guide means which glide or reach into such chamber. Such space may further be arranged to accommodate holding means for testing bottles, measuring probes or sensors, spraying means and similar devices.

According to the invention one or more heating coils may be attached to the outside wall of the cylindrical chamber for preheating such chamber. The coils cover a substantial portion of the surface of the chamber wall and are attached to the wall in contact therewith. This has the advantage that welded connections between the coils and the chamber are avoided. Such welded connections or joints are necessary in prior art sterilizing chambers with double walls and having a rectangular cross section. Such welded joints tend to corrode along the chamber walls and cause spots of reduced compressive strength. The invention avoids all of these drawbacks.

The preheating coils may comprise two prefabricated members, each having a half-cylindrical shape, which are connected to each other by means of bands or nuts and bolts so that both half-cylindrical coil members contact under mechanical tension the surface of the sterilizing chamber with their inner portions. Such heating coils make it possible to weld any pipe connections such as flanges for a steam supply pipe and condensate drains on the inside as well as on the outside of the sterilizing chamber. Such double weld assures a substantial, better control of the quality of the welding than is possible in the prior art where such inlet or outlet means or pipe connections extend through a double wall of the sterilizing chamber.

Furthermore, the immediate contact between the heating coils and the outer surface of the cylindrical sterilization chamber as well as the thin wall thickness made possible by such cylindrical shape assure an extraordinarily good heat transfer between the heating coils and the chamber. This reduces the time required for preheating as well as cooling which is particularly desirable in sterilization chambers used in pharmacies.

In order that the invention may be clearly understood it will now be described, by way of example, with references to the accompanying drawings, wherein.

Figure 1:
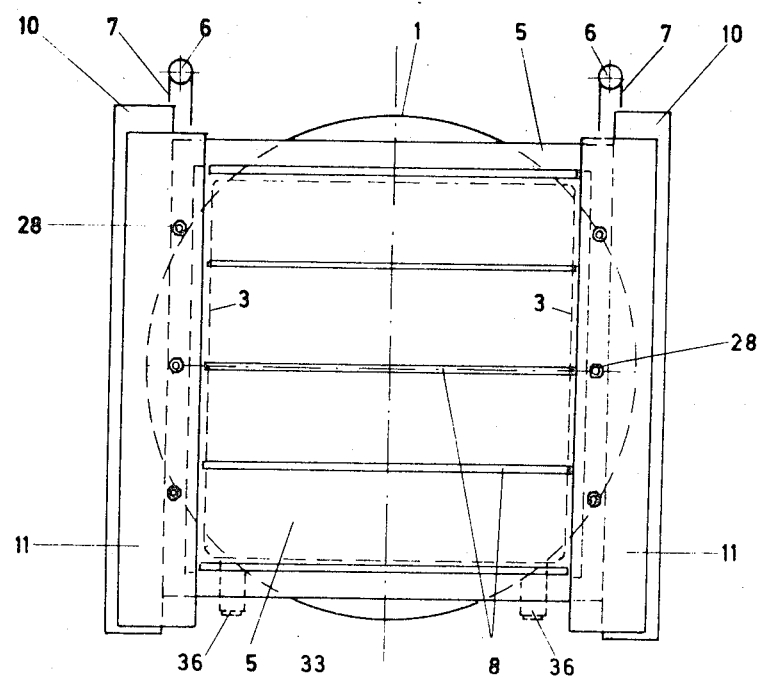
FIG. 1 is a front view of an embodiment of the invention.
Figure 2:
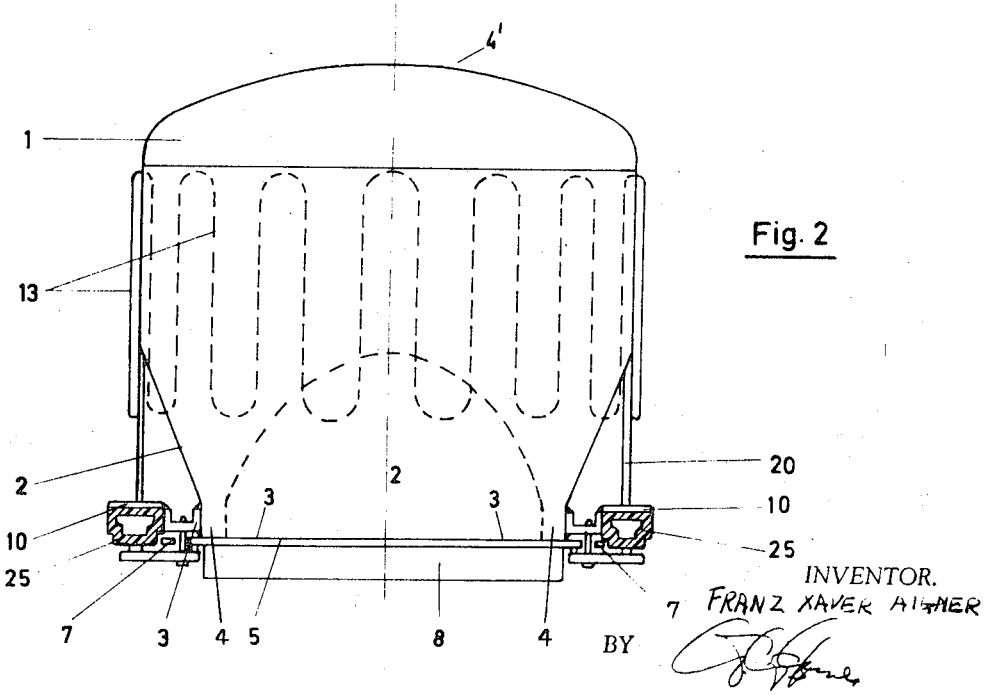
FIG. 2 is a top view of the embodiment of FIG. 1.

The sterilization apparatus embodied in FIGS. 1 and 2 comprises a cylindrical autoclave or chamber 1 having a relatively short axial length. According to the invention one end of the cylindrical chamber 1 has drawn-in tapered portions 2 which provide a rectangular end face 3. Such end face 3 forms a rectangular opening 4 for the charging and discharging of the sterilization chamber. The rectangular opening 4 is closeable according to the invention by a rectangular closure plate 5. For this purpose the plate 5 is supported in front of the rectangular opening 4 by means of a chain or rope lifting mechanism. For lifting the closure plate 5 the chain or rope 7 runs above the autoclave, for example, over motor driven chain drive wheels or rope takeup drums 6. The closure plate 5 is fortified by a number of rods 8 arranged in parallel to each other in order to take up the relatively high internal pressure which prevails during the operation of the sterilizing apparatus. The end of the chamber 1 opposite the rectangular opening 4, may be closed, for example, by a dished member 4' as seen in FIG. 2.

Figure 3:
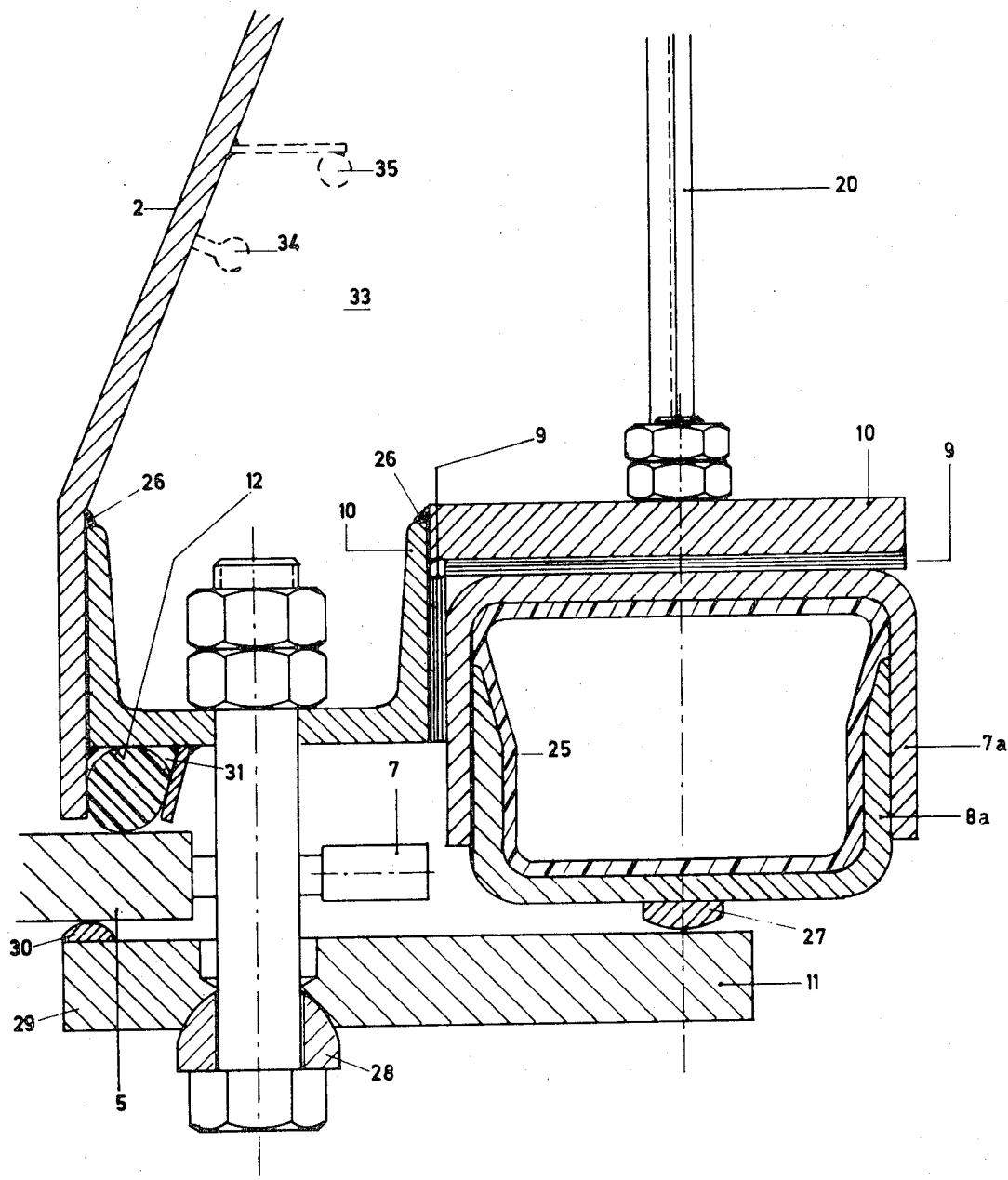
FIG. 3 is a sectional view of a detail of the closure means according to the invention, whereby a somewhat larger scale then in FIG. 2 is used.

In order to sealingly press the closure plate 5 against the rectangular opening of the autoclave there is provided a resilient hydraulic or pneumatic pressure hose 25 best seen in FIG. 3. Such hose is located between U-shaped channel members 7a and 8a one of which is so dimensioned that it fits glidingly into the other U-channel whereby the open U-sides face each other. One U-channel 7a is attached to a supporting structure 10. An insulating layer 9, for example of asbestos, is arranged between the supporting structure 10 and the channel member 7a. The supporting structure 10 is attached to the outer wall of the autoclave 1 by weldments 26 as well as by bracing struts 20. The other U-channel 8a is movable back and forth within the fixedly supported U-channel 7a by means of the resilient pressure hose 25 whereby such channel 8a will press, preferably along a ridge 27, against one end of a lever bar or pressure bar 11. The lever bar 11 is pivotally supported at 28 and pressures with its other end 29, preferably also along a ridge 30, the closure plate 5 against a gasket member or sealing strip 12 which is supported in a groove or channel 31 surrounding the autoclave opening 4.

To the outer surface of the autoclave 1 there is attached a preheating coil 13 which extends around the entire cylindrical surface. Preferably such coil is made up of two half-cylindrical portions which are so connected to each other that they are under a tensile force which causes the coils 13 to tightly cling to the surface of the autoclave.

Figure 4:
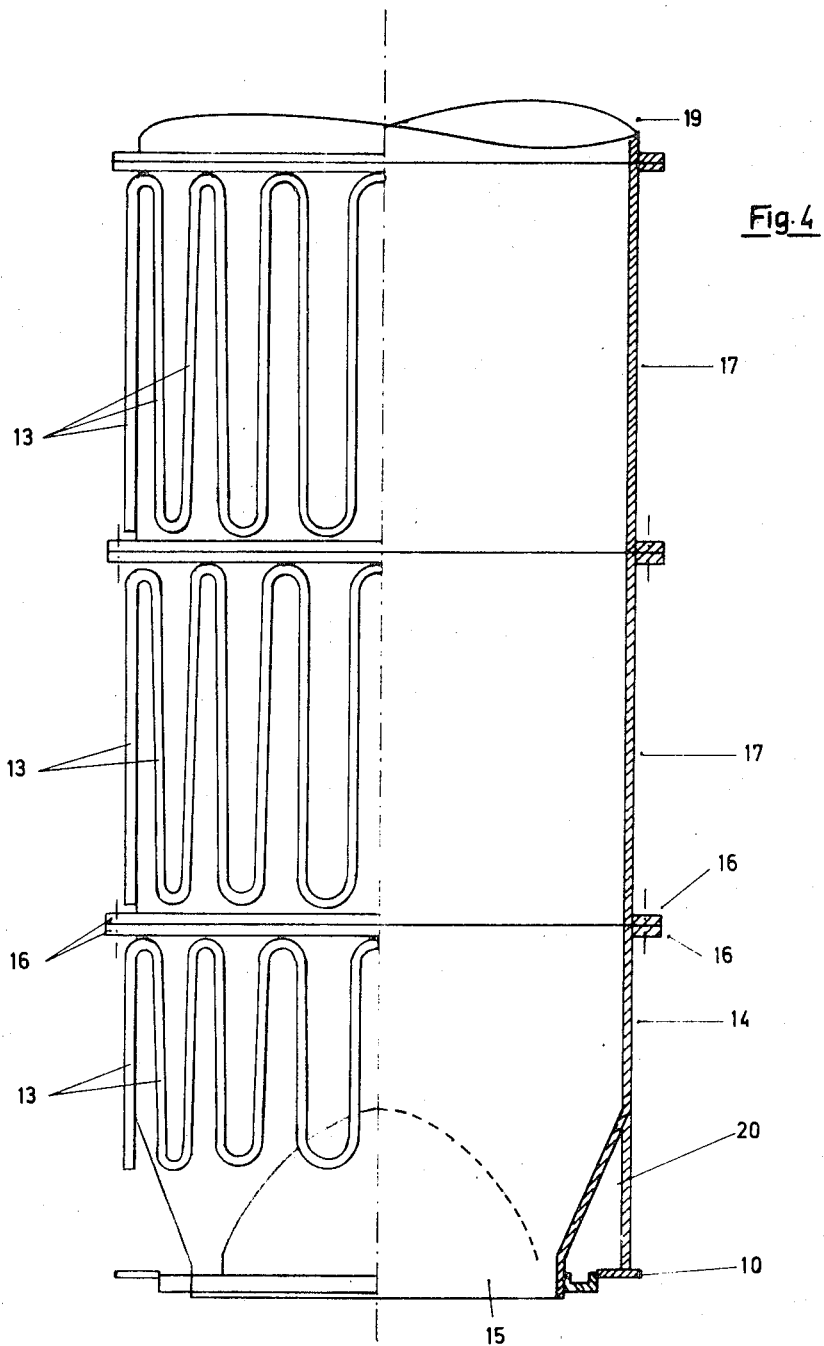
FIG. 4 illustrates a top view of another embodiment of the invention comprising a plurality of cylindrical chamber members, one-half of FIG. 4 is a sectional view.

FIG. 4 illustrates a sterilization apparatus having a larger chamber volume. This larger volume may be obtained by attaching to each other a number of cylindrical chamber members 17. One chamber member may be provided at one end with the rectangular opening and with the closure plate according to the invention while the chamber member at the opposite end is provided with a chamber bottom 41 as shown in FIG. 2. A chamber member 14 having a rectangular opening 15 is attached through flanges 16 to a further chamber member 17. Each of the chamber members 14, 17 carries on its outer surface a preheating coil 13 corresponding to those shown in FIG. 2.

A chamber member 19 at the opposite end of the autoclave may also be provided with a rectangular opening if it is desired to charge and discharge the sterilizing apparatus in a running through operation. Otherwise the opposite end of the chamber would be provided with a bottom having no openings therein.

Referring to FIG. 3, the autoclave 1 has said tapering end portions 2 which provide at least four sector shaped spaces 33 which are adapted to accommodate means 34, 35, such as bottle holder clips or the like, adapted to hold items useful in the operation of the sterilizing apparatus.

Referring to FIG. 1 the sector shaped spaces 33 underneath the rectangular opening 4 may accommodate glide means, for example rails 36, attached to the autoclave 1 so that carts or the like may be moved on said rails into or out of the autoclave.

While the invention has been described with reference to particular examples, it is to be understood that it includes all modifications and equivalents within the scope of the appended claims.

What I claim is:

1. A sterilizing apparatus comprising, a cylindrical autoclave having at least one circular end face of given diameter, rectangular means defining a rectangular opening in front of said circular end face, an adapting collar (2) positioned between the circular end face and the rectangular opening defining means, said adapting collar having a circular end portion corresponding to said circular end face and connected thereto, said adapting collar further having sidewalls tapering from said circular end portion toward and into a rectangular end portion adjacent to said rectangular opening defining means, said rectangular end portion of said collar being connected to said rectangular opening defining means, rectangular, plane closure means for closing said rectangular opening, and elongated heating coils attached to the outer surface of the cylindrical autoclave, said heating coils having back and forth bent coil portions, such coil portions being also shaped relative to the outer cylindrical surface of said autoclave whereby a half-cylinder coil unit is formed, two of such half-cylinder coil units being attached to each other under mechanical tension so as to closely contact the outer surface of the cylindrical autoclave.

2. A sterilizing apparatus comprising, a cylindrical autoclave having at least one circular end face of given diameter, rectangular means defining a rectangular opening in front of said circular end face, an adapting collar (2) positioned between the circular end face and the rectangular opening defining means, said adapting collar having a circular end portion corresponding to said circular end face and connected thereto, said adapting collar further having sidewalls tapering from said circular end portion toward and into a rectangular end portion adjacent to said rectangular opening defining means, said rectangular end portion of said collar being connected to said rectangular opening defining means, rectangular, plane closure means for closing said rectangular opening, supporting members attached to two opposite edges of said rectangular opening defining means but spaced from the outer end of said edges to leave a space surrounding the opening defining means along the supporting members, a sealing strip held in said space and slightly protruding from the outer end of said edge, said rectangular, plane closure means including a rectangular plate and pressure means for pressing the plate against the sealing strip, said pressure means including two channels, one of which is fixedly attached to a respective one of said supporting members on each side of the autoclave and facing with an open side in the same direction as said rectangular opening of the autoclave, an expansible pressure hose in each of said channels, two further channels each fitting into one of said first mentioned channels and movable therein in response to the expansion of the hose when it is subjected to fluid under pressure, a pressure bar for each pair of the channels, and pivot means for pivotally mounting each pressure bar to its respective support member, each pressure bar extending with one end into contact with said further channel and with another end into contact with a margin of said closure plate.

3. The sterilizing apparatus according to claim 2, wherein said pivot means comprise a bolt with a head provided with a curved surface at one end thereof, a concave recess in said pressure bar for cooperation with said curved surface, said concave recess in the pressure bar extending into a bore for the bolt, the other end of the bolt comprising means for fastening the bolt to its support member.

4. The sterilizing apparatus according to claim 3, wherein said curved surface of the pivot means is part of a washer which rests with a plane surface against the head of the bolt, said pressure bar having a concave recess therein for pivotal cooperation with the curved surface of the washer, said bore in the pressure bar into which the concave recess extends having a diameter which is larger than that of the bolt to permit such pivoting.

* * * * *